H. JUNKERS.
WATER HEATING APPARATUS.
APPLICATION FILED JAN. 28, 1914. RENEWED SEPT. 28, 1916.

1,204,779.

Patented Nov. 14, 1916.
2 SHEETS—SHEET 1.

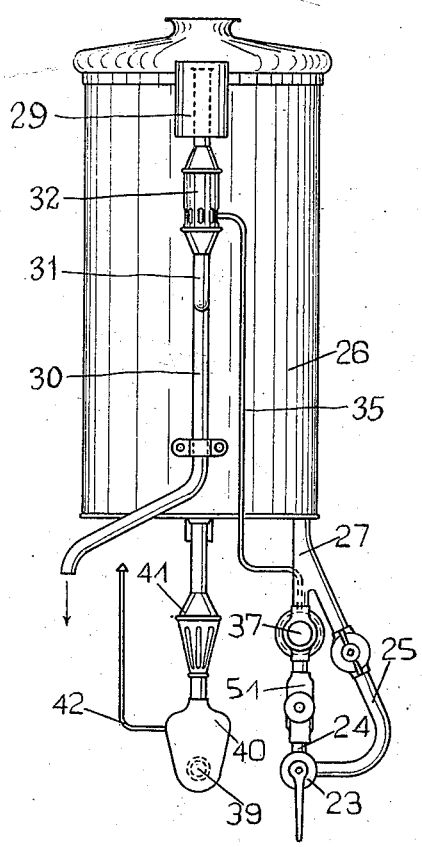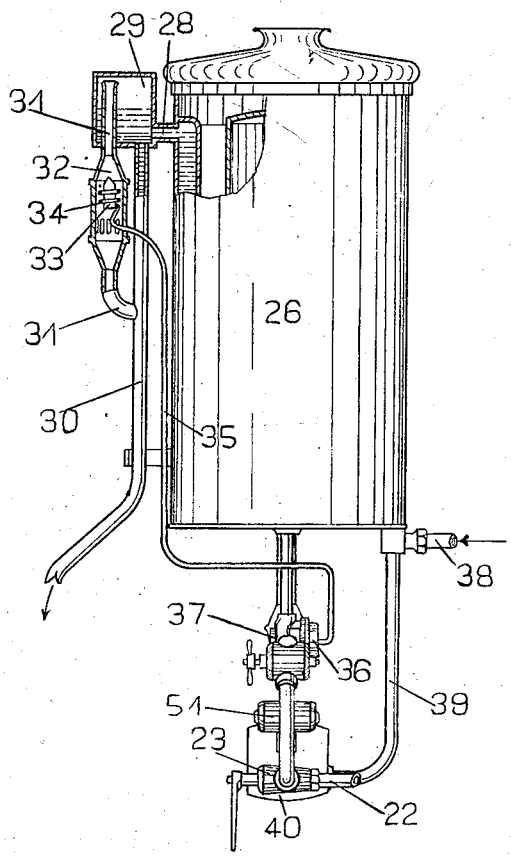

UNITED STATES PATENT OFFICE.

HUGO JUNKERS, OF AIX-LA-CHAPELLE, GERMANY.

WATER-HEATING APPARATUS.

1,204,779. Specification of Letters Patent. Patented Nov. 14, 1916.

Application filed January 28, 1914, Serial No. 815,011. Renewed September 28, 1916. Serial No. 122,737.

*To all whom it may concern:*

Be it known that I, HUGO JUNKERS, a citizen of the German Empire, residing at No. 68 Bismarckstrasse, Aix-la-Chapelle, in the Kingdom of Prussia, Empire of Germany, have invented certain new and useful Improvements in and Relating to Water-Heating Apparatus; and I do hereby declare the following to be a full, clear, and exact description of the invention, such as will enable others skilled in the art to which it appertains to make and use the same.

Heaters for liquids of the type in which the water is heated during its passage through the heater have many advantages over the type in which a large quantity is heated in reserve, particularly the advantages of continual readiness for use and of cheapness. Yet, in practice, such heaters have not been available for the production of boiling water, because failures were frequent and moreover they delivered only hot water, not boiling water. This also applies to heaters fitted with a thermostat for regulating the cold water supply, for the part of the thermostat influenced by the temperature is arranged in the water, and therefore changes its temperature slowly. Consequently the regulator is insufficiently sensitive. This disadvantage is avoided in the present invention in that the part of the thermostat which is sensitive to heat is not surrounded by the water, but by the steam which is formed when the boiling point is reached. In order to make certain of this, the outlet pipe for the boiling water is provided with an enlargement and the heat sensitive part of the regulating device is arranged in a special chamber, which latter is connected with the steam space of the said enlargement by means of a pipe. Such an arrangement allows of an entirely independent arrangement of the chamber containing the regulating device. The chamber is therefore surrounded by the atmospheric air and a very quick response to the regulating device is caused by the resultant rapid cooling down of the chamber; moreover this cooling can be further enhanced by the application of heat dissipating devices to the chamber. Further, in a heater for liquids constructed in accordance with this invention, the regulating device is capable of being made inoperative by means of a closable bypass pipe which branches off from the cold water supply pipe in advance of the cold water supply valve and returns to it beyond the valve.

In the accompanying drawings, I have illustrated several embodiments of the invention.

Figure 1:
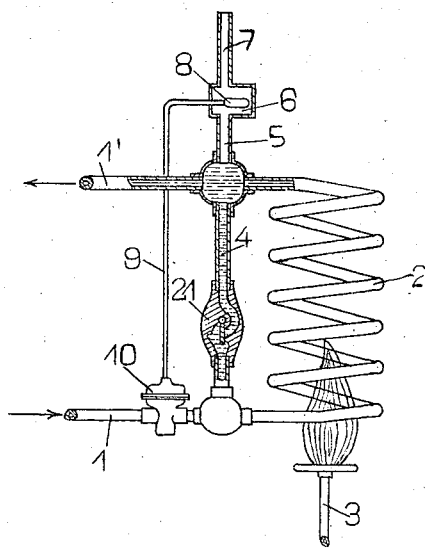
Figure 2:
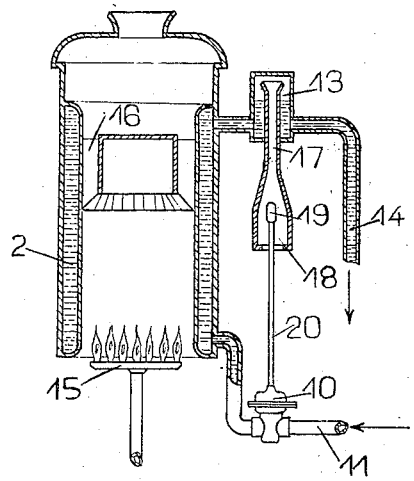

Figure 1 is a diagrammatic view showing the arrangement of the parts employed in one embodiment of the invention. Fig. 2 is a diagrammatic view showing the arrangement of the parts employed in a modified embodiment of the invention. Figs. 3 and 4 show the front and side views respectively of a more complete embodiment of the invention together with several details of the general arrangement. Fig. 5 is a cross-section through a maximum-supply valve which can with advantage be inserted in the supply pipe of the apparatus; and Fig. 6 is a sectional view of the thermostatically controlled valve which regulates the flow of water through the heater.

In Fig. 1, the heater is shown in the form of a spiral tube 2 into the lower end of which the cold water enters by a pipe 1 and from the upper end of which the heated water flows through a pipe 1', the water being heated while passing through the spiral tube by means of a suitable burner 3. Connected to the heater by a pipe 5 is a chamber 6 which communicates with the atmosphere by an outlet 7 and in which is positioned the heat-sensitive or pressure-sensitive chamber 8 of a thermostatic device from which a control pipe 9 leads to a valve 10 in the pipe 1. When the water has become heated to the boiling point the steam generated passes into the chamber 6 and causes an expansion of the liquid or other medium in the chamber 8, thus increasing the pressure of the liquid in the pipe 9 and opening the valve 10. If the temperature of the water falls below the boiling point, there will be no generation of steam and the liquid in the chamber will contract, thereby causing the valve 10 to close, to partly or entirely shut off the flow of water through the pipe 1 until the water in the spiral tube is heated to the boiling point, thereby causing the valve 10 to be opened as above set forth. In order to provide for a constant circulation of water and to insure that only boiling water will be led from the spiral tube through the pipe 1', a return pipe 4 is provided extending from the upper end of the heater, at the junction of the pipes 1' and 5, and terminating at the lower end of the heater, at a point between the valve 10 and the spiral tube 2. The pipe 4 may be provided with a non-return valve 21 allowing only a downward flow of water therethrough.

In Fig. 2, the heater is shown in the form of a vertically disposed, annular chamber having a central flue and a burner at the lower end of the flue.

Fig. 2 shows an embodiment of the invention in which a different form of heater is employed. The cold water from the supply pipe 11 enters the bottom of the double walled hollow cylinder 12, rising therein in the form of a thin layer and flowing on through the pipe 14 and an enlargement therein 13 to the places where it is used. The water is heated by means of a burner 15 of any desired type and an inserted heat transferring body 16 which is preferably of laminated construction. A pipe 17 projecting into the enlargement 13 is enlarged at its lower end to form the chamber 18 in which is situated a heat sensitive device, for example a temperature or pressure sensitive chamber 19 which is in communication with the water regulating valve 10 by means of the small tube 20. If the valve 10 is open to the flow of water to the heater and the boiling water produced by the action of the burner flows out through the pipe 14, then the steam from the boiling water will traverse the pipe 17 and enter the chamber 18 and there act on the heat or pressure sensitive chamber 19 in such a manner that the valve 10 will be set for a continuous supply. Immediately the outflowing water ceases to boil either by reason of an increase in consumption or insufficient heating power of the burner, there will be no more steam to keep the chamber 18 hot. On account of the chamber 18 being exposed to the cold air on all sides, it and the chamber 19 cool quickly and the contracting fluid in the chamber 19 throttles the flow through the water valve 10 until the flow through the heater is sufficiently retarded to cause it to boil again, whereupon steam again arises from the outflowing water and acting on the chamber 18 opens up the water supply valve 10 to a suitable degree.

In the form shown in Figs. 3 and 4 the cold water flows through the pipe 22 to the valve 23 which passes the water into the pipe 24 or 25 depending upon the position in which it is set. These two pipes re-unite closely in front of the heater 26 entering the latter at 27. At the top of the heater 26 and through the pipe 28 boiling water flows into an enlargement 29 and thence to the outlet. The enlargement 29 is penetrated by a pipe 31 open at its upper end and at its lower end is enlarged to form a chamber 32 below which it joins the outflow pipe, the chamber 32 being in the present example lantern shaped and provided with windows at the top and at the bottom. In the chamber 32 and around a flow impeding cone 33 there is wound spirally the end of a heat sensitive tube or chamber 34 which is continued by means of the pipe 35 to the valve chest 36 the front valve 37 of which is fixed in the pipe 24 and opens up or throttles the water supply to a greater or less degree. The fuel gas reaches the burner through the pipes 38, 39, the intermediate piece 40 and the Bunsen burner 41 and it is also profitable to provide a pipe 42 for a pilot flame branching off at a suitable place and leading directly to the burner. The mode of operation is similar to that described in connection with Fig. 2: The water flows through 22, the cock 23 and the pipe 24 or 25 according to the setting of 23, then it enters the heater 26 and flows boiling through the enlargement 29 and the outlet 30. The steam arising from the boiling water reaches the lantern shaped chamber 32 by means of the pipe 31, here it influences the heat sensitive chamber or spiral 33 and passes through the lower bent pipe 31 back into the outlet pipe 30 in the form of steam, boiling or hot water. The effect on the heat sensitive chamber or spiral is transmitted through the pipe 35 to the valve chest 36 and there it actuates the valve 37 in such a manner that the water is allowed to flow through the pipe 24. As soon as the outflowing water ceases to boil, no more steam will reach the chamber 32 through the pipe 31. On account of its insulated position and particularly on account of its windows the heat sensitive chamber or spiral soon cools and the contracting medium will cause the valve 37 to close so far that the decreased flow through the heater 26 will cause boiling water to be delivered by the heater again.

If very large quantities or sudden intermittent small quantities of boiling water are drawn off, the rate of flow of the water through the heater might become so great that water which was not boiling would flow out before the regulating device 34 cooled sufficiently to cause the regulator to act. In order to prevent this from happening, it is advisable to insert in the supply pipe a maximum-flow valve, such as, for example, that shown in Fig. 5. Such a valve may be connected either in the pipe 22 in advance of the valve 23, or on the other side of valve 23 in the pipe 24, as is shown at 51 in Fig. 3.

In the construction of maximum-flow valve shown in Fig. 5, the water enters by the pipe 43 and eventually leaves by the pipe 44. In the central valve chest 51 is situated the valve 45 shaped like a cylindrical slide valve and capable of axial movement under the pressure of the spiral spring 46. On the water side of the valve there are a pair of slots 47 in the cylindrical part of the valve or its cylindrical guide seating and openings 48 in the cylindrical part of the valve. Thus the water can flow from the pipe 43 through the slots 47 and the openings 48 into the inner part of the slider 45 and thence through the opening 49 into the pipe line 44. This can however only occur so long as the velocity of the water is comparatively low and the spring can balance the pressure on the valve. As soon as a too violent flow of the water overcomes the pressure of the spring and moves the valve axially, the foot 50 of the valve begins to close the passage 49 and thus to throttle the liquid by reason of the reduced cross-section of the passage. By suitably proportioning the passages in the valve, the masses to be moved and the spiral spring 46, the valve can be so arranged that with all other valves fully open the whole apparatus will still deliver water of a certain given temperature; with a given heating capacity of the apparatus this valve automatically maintains a certain minimum temperature.

Fig. 6 shows a form of thermostatically controlled valve for regulating the flow of water to the heater such as may be employed at 10 in Figs. 1 and 2 and at 37 in Figs. 3 and 4. The casing of this valve is formed to provide an inlet 54 and an outlet 55 and also a chamber for the actuating fluid 53 which enters the chamber through a tube 52 corresponding to the tube 9 of Fig. 1 or 20 of Fig. 2, or 35 of Figs. 3 and 4. The chamber for the liquid 53 includes a flexible or movable wall 59 which is adapted to engage and actuate a valve member 57 which is movable within a chamber 56 formed in the valve casing. The valve member 57 is moved in one direction by a coiled spring 58 which holds the valve member 57 always in contact with the wall 59 of the chamber for the fluid 53. The valve member 57 is provided with a circumferential groove 60 so positioned that the annular chamber provided by this groove between the valve member 57 and casing 56 is in connection with the inlet 54 of the valve casing. The casing 56 is also provided with a groove 61 forming an annular chamber about the valve member 57 and communicating with the outlet 55. The chambers 60 and 61 are adapted to overlap more or less so as to permit the flow of water from the inlet 54 through the chambers 60 and 61 to the outlet 55 and the extent of the overlap of chambers 60 and 61 is regulated by the joint action of the spring 58 and the effect of the fluid 53 on the movable wall 59. As wall 59 is moved out by the fluid 53, it moves the valve member 57 against the tension of spring 58 to increase the overlap of the chambers 60 and 61 so as to allow greater freedom of flow of water through the valve and, conversely, as the spring 58 overcomes the action of the wall 59 and moves the valve member back, the freedom of flow of the water through the valve is reduced or cut off.

What I claim is:

1. Water heating apparatus comprising the combination of a heater, pipes carrying water to and from the heater, a steam chamber connected to the heater and adapted to receive steam therefrom independently of the level of the water in the heater, a thermostatic device entering said chamber and actuated by the steam therein, and a valve in one of said pipes controlled by said thermostatic device, substantially as described.

2. Water heating apparatus comprising the combination of a heater, pipes carrying water to and from the same, a steam chamber connected to the heater to receive steam but not water therefrom, a thermostatic device entering said chamber and actuated by steam therein and a valve in one of said pipes controlled by said thermostatic device, substantially as described.

3. Water heating apparatus comprising the combination of a heater, pipes carrying water to and from the same, a chamber located outside the heater and arranged to dissipate heat, a connection from the upper portion of the heater to said chamber for conveying steam to the chamber, a thermostatic device entering the chamber and actuated by the steam therein and a valve in one of said pipes controlled by said thermostatic device, substantially as described.

4. Water heating apparatus comprising the combination of a heater, pipes carrying water to and from the same, a valve in one of said pipes constituting a means for controlling the flow of water through the heater, a steam chamber connected to the heater and adapted to receive steam therefrom, a thermostatic device entering said chamber and actuated by the steam therein, and a connection from the thermostatic device to said valve, substantially as described.

5. Water heating apparatus comprising the combination of a heater, an admission pipe carrying water to the same, an outlet pipe leading from the heater, a steam chamber connected to the heater to receive steam therefrom, a thermostatic device entering said chamber and actuated by the steam therein, a valve in said admission pipe controlled by said thermostatic device and a bypass around said valve, substantially as described.

6. Water heating apparatus comprising the combination of a heater, pipes carrying water to and from the same, a steam chamber connected to the heater to receive steam therefrom, a thermostatic device entering said chamber and actuated by the steam therein, a valve in one of said pipes controlled by said thermostatic device and a valve in one of said pipes limiting the maximum flow of water to and through the heater, substantially as described.

7. Water heating apparatus comprising the combination of a heater, an admission pipe carrying water thereto, a valve in said admission pipe, a chamber connected to the upper portion of the heater to receive steam therefrom, an outlet pipe leading from said chamber, a casing for a thermostatic device connected at one end to the upper portion of said chamber and at the other end to said outlet pipe and a thermostatic device located in said casing and connected to said valve in the admission pipe, substantially as described.

In testimony whereof I have signed my name to this specification in the presence of two subscribing witnesses.

HUGO JUNKERS.

Witnesses:
    MAX KROSS,
    LUDWIG WAGENSEIL.